March 3, 1953  H. F. FIFIELD  2,630,159
SEAT TRACK OF THE SWINGING TYPE FOR AUTOMOTIVE VEHICLES
Filed July 29, 1950  2 SHEETS—SHEET 2
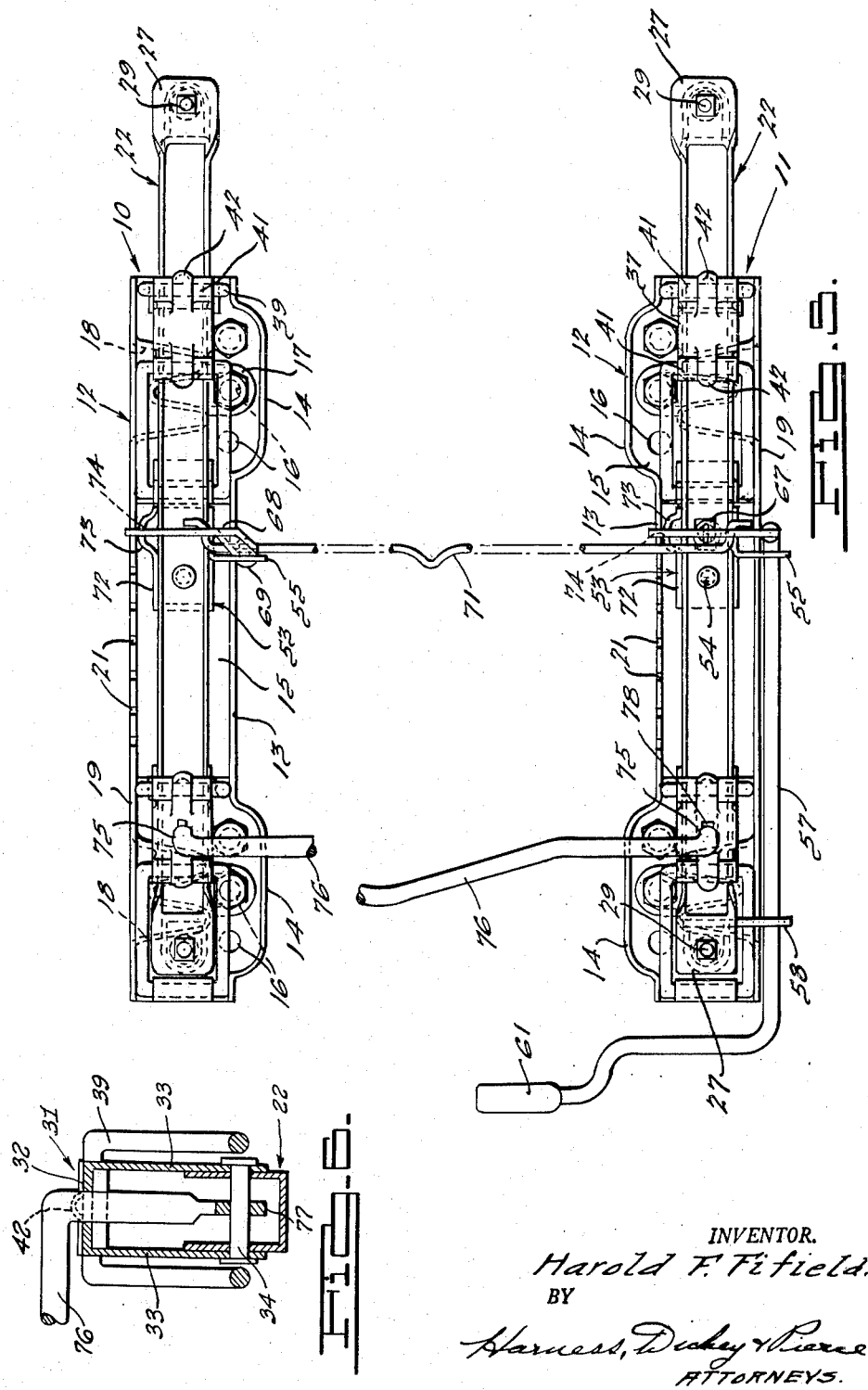
INVENTOR.
Harold F. Fifield.
BY
Harness, Dickey & Pierce
ATTORNEYS.

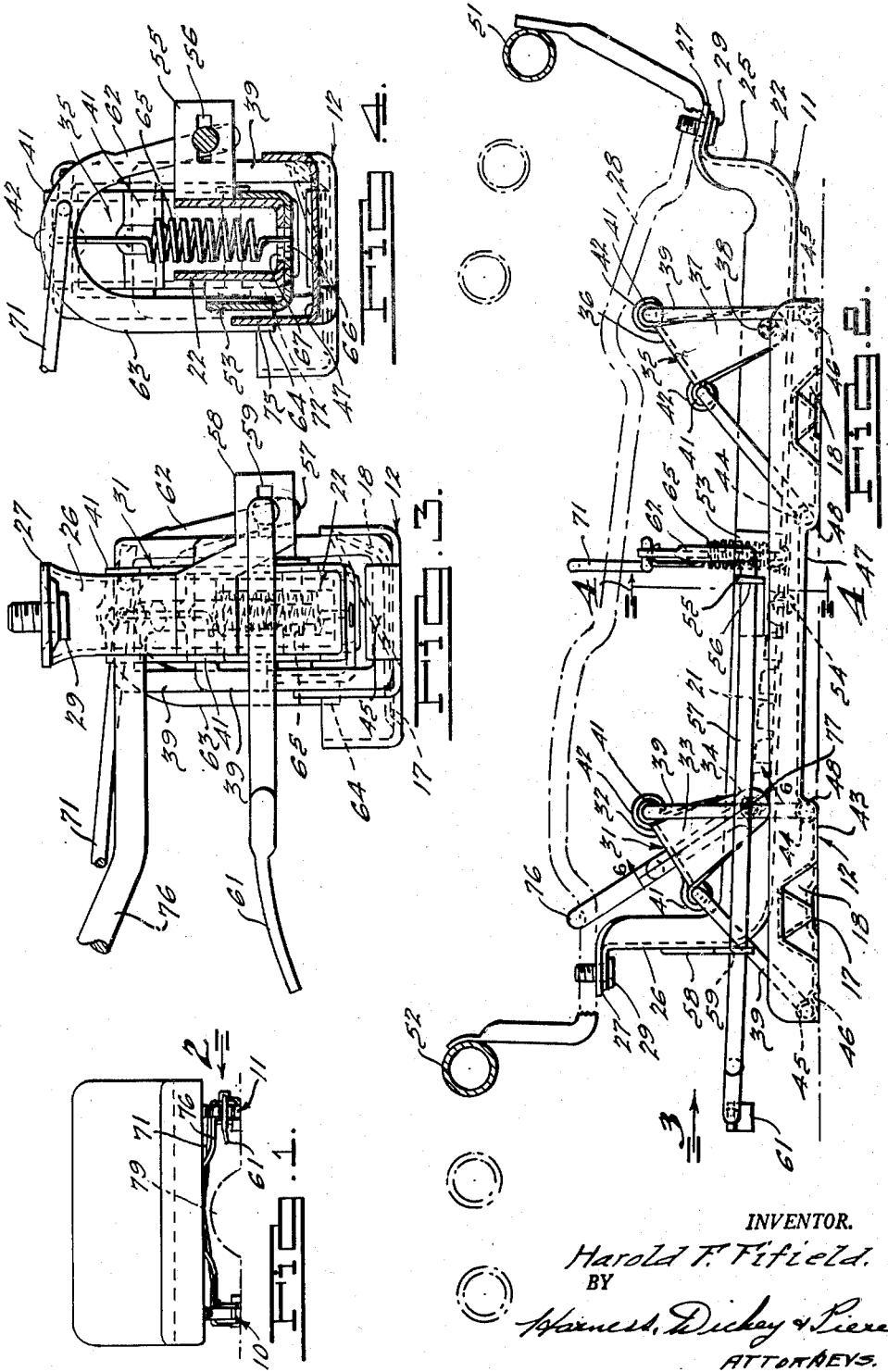

UNITED STATES PATENT OFFICE 2,630,159

SEAT TRACK OF THE SWINGING TYPE FOR AUTOMOTIVE VEHICLES

Harold F. Fifield, Detroit, Mich., assignor to American Metal Products Company, Detroit, Mich., a corporation of Michigan Application July 29, 1950, Serial No. 176,674

9 Claims. (Cl. 155—14)

This invention relates to tracks by which seats are adjusted, and particularly to a track controlling the forward position of the seat and the elevation thereof in various positions of adjustment.

Tracks have been employed heretofore for the adjustment of seats having a floor-engaging support and a seat-engaging support which were interconnected by ball bearings or links to permit the support and seat to be adjusted relative to the base support. In the link type of track the seat moved on an arc controlled by the length of the links and therefore had an arcuate movement which was uniform throughout the degree of travel.

The present invention pertains to a base support and a seat support, the latter of which is mounted in longitudinal swinging relation to the former. A pair of O-shaped links is pivoted to the base support at each of its ends, the opposite ends of the pairs of links being pivoted to the web of U-shaped hinge elements. The ends of the arms of the elements are pivoted to the seat support. By shaping the arms of the hinge elements so as to change the position of the pivots at the end of the arms relative to the web of the elements, the motion of the seat may be changed from a straight line horizontal motion to a motion which combines a vertical movement at the forward and rearward end of the seat. The base support is of channel section, one side of which has a sloping portion containing notches by which the seat support may be latched in adjusted position. A pair of brackets is provided on the seat support for pivotally supporting an operating lever which has a handle on one end and a U-shaped latching element on the other end. A similar U-shaped latching element is mounted on a bracket on the opposite seat support and a tie rod interconnects the U-shaped latching elements, one arm of which is of substantial length to provide a desired movement when the lever is actuated so that both latches will be withdrawn simultaneously from the notches in the base supports. When the latches are released in this manner, the seat may be moved forwardly or rearwardly quietly and with very little effort in view of the interconnection of the seat and base support by the links and hinge elements. Thereafter the latches retain the seat in desired adjusted position. The hinge element of the structure herein illustrated is so formed at the rear as to produce the raising of the rear portion of the seat as it moves forwardly while the front portion thereof is being maintained substantially in a straight line, although in the illustrated embodiment the front end moves down a slight amount.

Accordingly, the main objects of the invention are: to provide a seat track having a base and seat support which are secured together by pivoted links and hinge elements to permit the seat support to swing longitudinally of the base support; to form the hinge element of the seat track in such manner as to produce a desired elevation of the seat for various adjusted positions; to provide a channel-shaped base support which is attachable to the floor of the vehicle and a channel-shaped seat support which is suspended above the base support by pivoted means which controls the forward swinging of the seat support on a line which produces the desired elevation and tilting of the seat relative to the floor in various longitudinally adjusted positions, and, in general, to provide a seat support which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a front view in elevation of the seat mounted on a seat track of the present invention;

Figure 2 is an end view of the right-hand portion of the track illustrated in Fig. 1;

Fig. 3 is a view of the track illustrated in Fig. 1 as viewed from point 2 thereof;

Fig. 4 is a sectional view of the track illustrated in Fig. 2, taken on the line 4—4 thereof;

Fig. 5 is a plan view of the complete track which supports the seat as illustrated in Fig. 1, and Fig. 6 is a sectional view of the structure illustrated in Fig. 2, taken on the line 6—6 thereof.

The track of the present invention comprises a left-hand track element 10 and a right-hand track element 11. Both of the track elements are of exact form except for right and left-hand disposition and except for the latching lever supported thereby. Each track element is made of a base support 12 which is of channel shape and which is of right and left-hand disposition. The inner flange 13 of the base support is extended outwardly at 14 near each end to extend the width of the web 15 thereat so that a plurality of apertures 16 may be provided therethrough for anchoring the base element to the floor of a vehicle. Preferably two apertures are provided in the floor, spaced a distance apart equal to the spacing of the apertures 16 so that the base element may be mounted in one of two positions and still always be secured to the floor by a bolt through the central aperture 16. This is desirable as the aperture 16, as illustrated in Fig. 2, is provided in an embossed portion 17 of the web 15, which embossed portion extends into an embossed portion 18 in the outer flange 19 of the base element. Since the apertures 16 are located on one side of the center line of the base support, the flange 19 and web 15 are reinforced by the embossments 17 and 18 which extend across the base support at each end. The flange 13 slopes upwardly toward the front and is provided with a plurality of notches 21 to receive a latch, as will be explained hereinafter.

A seat support 22 of channel section, has at the rear an upwardly extending portion 25 and at the forward end an upwardly extending portion 26, with the ends 27 thereof flanged outwardly and flattened to form a support for the seat frame 28 to be applied thereto. The flanges 27 have bolts 29 staked, welded or otherwise secured thereto to which the seat 28 is securely bolted. A U-shaped hinge element 31 has a web portion 32 and a pair of extending arms 33 the ends of which are secured to the forward portion of the seat support 22 by a pivot 34. A rear hinge element 35 has a web portion 36 and a pair of extending arms 37 the ends of which are secured to the rear end of the seat support by a pivot 38. A pair of O-shaped links 39 is pivoted to the ends of the web 32 and 36 of the hinges 31 and 35 and are in like manner pivoted to the forward end and rearward end of the base support. This permits the seat support 22 to swing forwardly and rearwardly longitudinally of the base support in a controlled manner.

The ends of the webs 32 and 36 are shaped to provide cylindrical bearings 41, having a central embossed portion 42 to provide strength. The metal in the web 15 of the base element is lanced out at 43 and rolled to form cylindrical bearings 44 which secure the lower portion of the O-links 39 inwardly of the ends of the base element. The web 15 is extended at the ends and reversely formed into cylinders 45 to provide bearings for the endmost links 39. To complete the cylindrical form, the web 15 adjacent to the cylinder portion 49 is embossed at 46, while at the bearing 44 the web is embossed inwardly at 47 to have the portion 48 complete the cylinder 44.

It will be noted that the hinge element 31 has the pivot 34 disposed normal to the center of the web 32 between the cylinder bearings 42, while the hinge element 35 at the rear end has the pivot 38 disposed normal to the web 36 adjacent to one of the bearings 42. By offsetting the pivot 34 or 38 relative to the web 36, control is provided for the movement of the seat in elevation relative to the longitudinal adjustable movement thereof. When both of the hinge elements are similar to the hinge element 31, then a straight-line motion is produced to the seating cushion. When the pivot is offset from the position of the hinge element 31, such as in the hinge element 35, then a vertical movement is provided to the seating cushion which changes for various longitudinally adjusted positions. In the illustration of Fig. 2, it will be noted that the rear frame member 51 of the seat moves upwardly a substantial degree relative to the downward movement of the front frame member 52 as the seat support 22 is advanced forwardly. By changing the shape of the arms 33 or 37 of the hinge elements 31 and 35, respectively, different movements in elevation of the front and rear portions of the seat cushion may be obtained or the seat cushion may be adjusted without any change in elevation. When a normal to the web 32 from the pivot 34 is centrally of the pivots 41, as illustrated, a straight-line movement to the seat support 22 occurs. When the normal is disposed toward a pivot 42, as illustrated at the right-hand end of Fig. 2, then a component of vertical movement is added to the horizontal movement.

A channel-shaped bracket 53 is secured by a rivet 54 to the central portion of the seat support 22, the bracket having an outwardly extending arm 55. The bracket on the right-hand track element 11 has its arm 55 provided with an aperture 56 in which an operating lever 57 is journaled. A bracket 58 is secured to the upwardly extending portion 26 of the seat support 22, having an aperture 59 therein in which the forward end of the lever 57 is journaled. The lever is formed at the front end to provide an operating handle 61. The rear end of the lever extends upwardly at 62 and is formed over and downwardly at 63 in inverted U shape to provide a latching end 64 which engages a slot 21 in the flange 13 of the base support 12. A spring 65 is attached to the top or web portion of the U-shaped latch, having its opposite end secured to a tongue 66 provided in the web of the seat support 22 and channel bracket 53 by the C-shaped cutout portion 67 in the webs thereof.

A U-shaped latch 68, similar to the latch 63, is offset and secured to the arm 55 of the bracket 53 by a rivet 69 on which the latch 68 pivots. A tie rod 71 interconnects the latches so that when the latch 63 is operated by the lever 57, the latch 68 is operated therewith. It will be noted that the flange 72 on the latch side of the bracket 53 is flanged outwardly at 73 to form a slot 74 for guiding the ends 64 of the latches 63 and 68. The latch 63 is carried by the right-hand track element 11, as illustrated in Fig. 5, while the latch 68 is carried by the left-hand track element 10, the latches being operated simultaneously through the use of the tie rod 71.

The webs 32 of the hinge elements 31 are provided with an aperture 75 for receiving downwardly extending end portions of a spanning or torsion bar 76. The ends are flattened at 77 and provided with an aperture through which the pivots 34 extend. The apertures 75 are elongated at 78 to permit the flattened ends 77 of the torsion bar to pass therethrough. Both the torsion bar 76 and the tie bar 71 are offset upwardly so as to clear the tunnel 79 at the central part of the vehicle floor. The spanning or torsion bar controls the swinging of both the right and left-hand seat supports 22 in synchronism with each other so as to maintain the seat parallel in all of its shiftable positions.

As pointed out above, the change in elevation of the seat support when adjusted longitudinally was obtained by offsetting the pivots 34 and/or 38 of the hinge elements 31 and 35. It is to be understood that the same result may be obtained by making one of the pairs of links 39 longer than the other or, when the links are of the same length, elevating one of the bearings 44 or 45 above the other.

What is claimed is:

1. A seat track embodying right and left-hand track elements, each element having a base support which is attachable to a floor, a seat support which is disposed thereabove, pairs of links pivoted to the front and rear ends of the base support, U-shaped hinge elements having a web and extending arms, the ends of the webs being pivoted to the pairs of said links, means for pivoting the ends of the arms to the seat support, and latching means carried by said seat support and base support for retaining the seat support in adjusted position relative to the base support.

2. A seat track embodying right and left-hand track elements, each element having a base support which is attachable to a floor, a seat support which is disposed thereabove, pairs of links pivoted to the front and rear end of the base support, U-shaped hinge elements having a web and extending arms, the ends of the webs being pivoted to the pairs of said links, means for pivoting the ends of the arms to the seat support, latching means carried by said seat support and base support for retaining the seat support in adjusted position relative to the base support, and a torsion bar secured to oppositely aligned hinged elements of said track elements and extended thereacross for causing the operation of said seat supports in unison.

3. A track support for a seat comprising right and left-hand track elements each having a base support of channel section having a web and spaced side walls, the web of which is provided with apertures on one side of the longitudinal center line by which the base support is secured to a floor, embossments in said web about said aperture and extending to the opposite side of the center line of the base support into the remote side wall of the channel section for strengthening the base support when secured by bolts to a floor, and a seat support adjustably supported on said base support.

4. A seat support comprising a pair of spaced track members of right and left-hand construction, each track member having a channel-shaped base support, a channel-shaped seat support the webs of which are of less width than the width of the web of the base support and vertically aligned therewith, hinge elements pivoted to said seat support near the forward and rearward ends thereof, pairs of O-shaped links pivoting said hinge elements to said base support in a manner to provide stability thereto, and latching means for securing the seat support in adjusted position relative to the base support.

5. A seat support comprising a pair of spaced track members of right and left-hand construction, each track member having a channel-shaped base support, a channel-shaped seat support the webs of which are of less width than the width of the web of the base support, hinge elements having a web and extending arms, the ends of which are pivoted to said seat support, one near the forward end and another near the rearward end thereof, pairs of links pivoting said hinge elements to said base support permitting the seat support to swing in a predetermined path controlled by the location of the pivot points of the hinge support, latching means for securing the seat support in adjusted position relative to the base support, and a torsion bar secured adjacent to the web portion of a hinge element remote from the pivoted ends of the arms of the right and left-hand seat tracks for forcing the seat supports to operate in unison.

6. In a seat support, a pair of spaced seat tracks, each seat track comprising a base member which is securable to a floor, a seat support for supporting a seat above said track, a pair of U-shaped hinge elements having a web and downwardly extending arms, the lower ends of which are pivoted respectively to opposite ends of said seat support, pairs of O-shaped links connecting the web of each hinge element to said base support, the pivot points of the hinge elements secured to said links being disposed above the pivot point of the hinge elements secured to the seat support, and a torsion bar connecting the web of one hinge element of one track with the web of the corresponding hinge element of the other track to force the seat supports to operate in unison.

7. In a seat support, a pair of spaced seat tracks, each seat track comprising a base member which is securable to a floor, a seat support for supporting a seat above said track, a pair of U-shaped hinge elements having a web and downwardly extending arms, the lower ends of which are pivoted respectively to opposite ends of said seat support, pairs of O-shaped links connecting the web of each hinge element to said base support, the pivot points of the hinge elements secured to said links being disposed above the pivot point of the hinge elements secured to the seat support, and a torsion bar connecting the web of one hinge element of one track with the web of the corresponding hinge element of the other track to force the seat supports to operate in unison, the disposition of the point of engagement of a line from the pivot of the hinge element, with the seat support normal to a line between the pivots of the links with the hinge elements toward one of the last said pivots from the position midway therebetween regulating the degree of vertical movement provided to the seat support when the latter is moved horizontally.

8. In a seat construction, a base member, a seat supporting member, means for interconnecting said two members for longitudinal movement relative to each other, a latching lever carried by the seat supporting member having an inverted U-shaped latching portion, a similar inverted U-shaped latching portion on the other of said seat supporting members, said U-shaped latching portions having the ends extending downwardly, one end being pivoted, the other end forming a latching finger, and notches provided in the base member in which the finger ends of the U-shaped latching portions may project.

9. In a seat construction, a base member, a seat supporting member, means for interconnecting said two members for longitudinal movement relative to each other, a latching lever carried by the seat supporting member having an inverted U-shaped latching portion, a similar inverted U-shaped latching portion on the other of said seat supporting members, said U-shaped latching portions having the ends extending downwardly, one end being pivoted, the other end forming a latching finger, notches provided in the base member in which the finger ends of the U-shaped latching portions may project, and a tie bar at the top end of said latches to provide lever arms of substantial length for having both of the latching elements operate in unison when one of the latching elements is actuated.

HAROLD F. FIFIELD.

REFERENCES CITED

The following references are of record in the file of this patent:

UNITED STATES PATENTS

| Number | Name | Date |
|---|---|---|
| 709,110 | Olson | Sept. 16, 1902 |
| 1,941,901 | Knabusch et al. | Jan. 2, 1934 |
| 2,096,437 | Potter | Oct. 19, 1937 |
| 2,195,507 | Best | Apr. 2, 1940 |

FOREIGN PATENTS

| Number | Country | Date |
|---|---|---|
| 102,899 | Australia | Jan. 13, 1938 |